Aug. 20, 1968    A. F. DE VIGAN    3,397,517

DUST AND LIKE SOLID PARTICLE SEPARATOR

Original Filed Dec. 9, 1964    3 Sheets-Sheet 1

INVENTOR
ANDRÉ F. de VIGAN

BY *Strauch, Nolan & Neale*

ATTORNEYS

INVENTOR
ANDRE' F. de VIGAN

BY Strauch, Nolan & Neale
ATTORNEYS

# United States Patent Office 3,397,517
Patented Aug. 20, 1968

3,397,517
DUST AND LIKE SOLID PARTICLE SEPARATOR
Andre F. De Vigan, 14898 Mayfield St.,
Detroit, Mich. 48205
Continuation of application Ser. No. 417,140, Dec. 9, 1964. This application Oct. 14, 1966, Ser. No. 587,386
6 Claims. (Cl. 55—400)

ABSTRACT OF THE DISCLOSURE

Apparatus for separating solid particles from a gas comprises a casing having longitudinally continuous annular side wall terminating in an open end inlet through which gas to be cleaned is introduced, a motor mounted within the opposite end of said casing, and a combined fan and particle collection member having an end wall secured on the motor shaft having an axially extending cylindrical side wall extending substantial coaxially with and in close association with the annular wall of said casing and having an open end adjacent said inlet but within said casing, there being an internal annular imperforate particle deposit and collection throat within the member at the open end a circumferential row of fan blades projecting radially inwardly axially inwardly of the throat with gas discharge openings being formed between said blades, and there being a cleaned gas outlet opening in said casing side wall adjacent said gas discharge openings.

---

This application is a continuation of my co-pending application Ser. No. 417,140 filed Dec. 9, 1964, now abandoned, for Dust and Like Solid Particle Separator.

This invention relates to devices for separating dust and like solid particles from a stream of air or like gas and is particularly concerned with a novel efficient structural arrangement that includes the provision of a special removable receptacle which may be disposable.

The invention is an improvement over the type of device disclosed in my U.S. Letters Patent No. 2,233,520 issued Mar. 4, 1941.

It is the major object of this invention to provide a novel device for the separation of dust and like solid particles from a stream of air or other gas wherein the extracted particles are collected within the axially outer throat section of a bladed driven fan disposed with a casing having an air inlet opening in communication with said throat and an air outlet at the periphery of the fan.

It is a further object of the invention to provide in such a device for the removal and replaceable mounting of an open ended receptacle for receiving the removed particles, which receptacle may be disposable.

Further objects of the invention will appear as the description proceeds in connection with the appended claims and the annexed drawings wherein:

Figure 1:
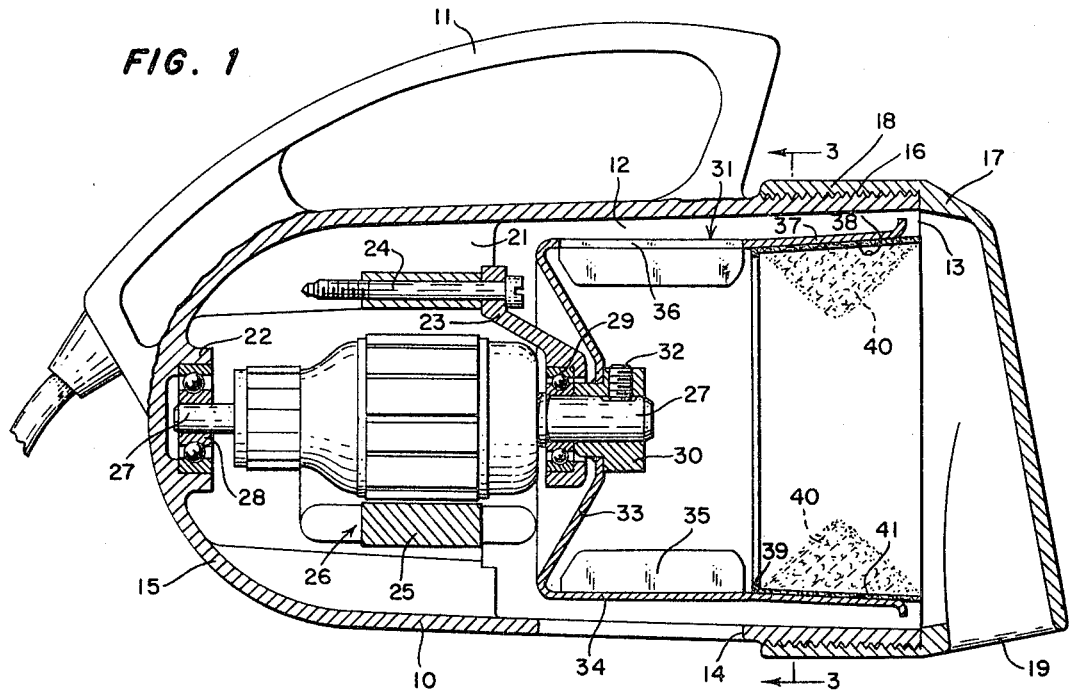
FIGURE 1 is a side elevation mainly in axial section showing a preferred embodiment of the invention.
Figure 2:
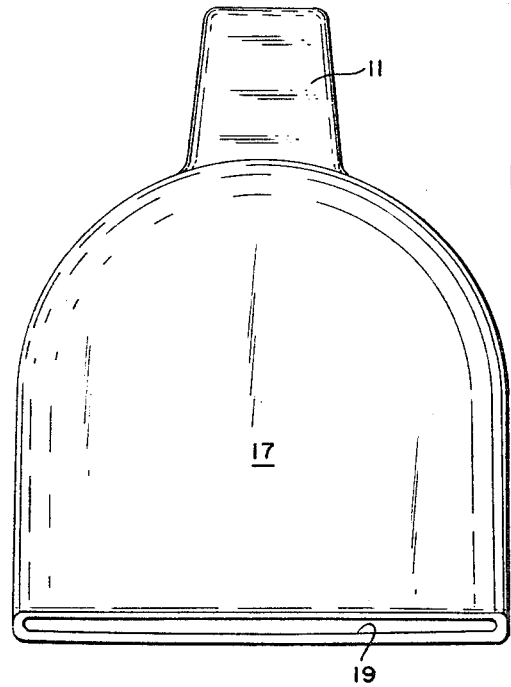
FIGURE 2 is an end view of FIGURE 1.
Figure 3:
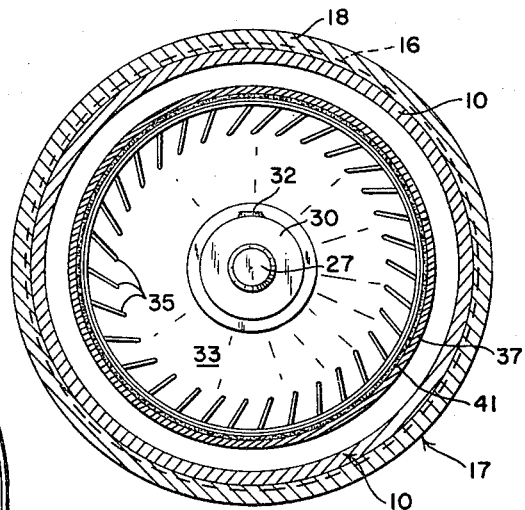
FIGURE 3 is a section on line 3—3 of FIGURE 1.

Referring to FIGURES 1–3, the unit is portable and comprises a casing 10 having a top handle 11 that may be an integral extension of the casing. Preferably casing 10 may be a molded one-piece plastic or cast metal part with integral handle 11. Casing 10 may be cylindrical or of any desired cross-section to provide an internal chamber 12 that extends to an open end 13 of the casing. A side opening 14 in the casing wall is also in communication with the chamber 12. The other end of casing 10 is closed by integral end wall 15 which is preferably adjacent the handle. Thus chamber 12 is closed except for openings 13 and 14.

Casing 10 is threaded at 16 around the open end for removably mounting a nozzle member 17 which is preferably a molded plastic or cast metal unit having an internally threaded boss 18 for mounting it on the casing and a bottom opening 19 that (FIGURE 2) is preferably elongated and extends transversely with respect to the casing axis.

Internally casing 10 is formed with a plurality of circumferentially spaced integral ribs 21 and a centered integral end wall boss 22. A bearing support 23 is removably secured on one or more ribs 21 as by machine screws 24 which also extend through the stator 25 of an electric motor 26 having an armature shaft 27 supported at opposite ends in bearing 28 of boss 22 and bearing 29 of support 23.

The hub 30 of a sirocco type fan 31 is mounted on shaft 27 as by set screw 32. This fan is a sheet metal member having an imperforate radial wall 33 and a cylindrical skirt 34 from which the blades 35 are formed by punching and bending out of apertures 36 to the generally parallel inclined arrangement shown in FIGURE 3.

As shown in FIGURE 1 the outer open end of the fan 31 comprises axially beyond blades 35 an annular imperforate throat section 37 wherein the inner surface 38 is an outwardly diverging cone of small angularity. Section 37 preferably terminates just short of opening 13.

At the inner end of throat section 37 is preferably rigidly mounted a flat stop ring 39 projecting only a small distance into chamber 12. The function of this ring is essentially to abut the inner end of an open ended conical receptacle 41 of paper or like disposable material slidably thrust into the open end of the fan assembly to be frictionally held there for a purpose to appear.

Referring to FIGURE 1 it will be seen that fan 31 has ample clearance with the inner walls of casing 10 and that the hollow interior of nozzle member 17 constitutes a gradually changing shape passage from nozzle opening 19 to casing opening 13. The effective area of opening 19 is less than that of opening 13.

Casing opening 14 is opposite to and level with the row of fan blades 35 and of an axial extent about equal to the fan blades. Since opening 14 is an air outlet as will appear it should not be restrictive and should have a total area at least as great or greater than air inlet opening 19.

In operation the motor 26 will be suitably energized. This is the usual high speed fan motor and so the fan 31 is rotated at high speed. Then the device is grasped by handle 11 and nozzle 17 applied to the surface to be cleaned. The lips at nozzle opening 19 are smoothed so as not to snag clothing, for example when the device is used as a clothes brush, or any fabric, rug or the like. The device will equally well be applicable to hard or smooth surfaces although on smooth surfaces care should be taken not to block off opening 19 entirely by pressing too hard onto the surface. Normally the air cushion of the stream of air drawn in at opening 19 is sufficient to support the weight of the device to prevent such blocking of opening 19.

The dust or other particle-laden air entering nozzle opening 19 is drawn through the nozzle and opening 13 by the suction side of the fan. This entering air passes with a swirling action into throat 37. Little or none of this entering air goes into the annular chamber space around the rotating fan member, because this annular chamber space is in communication with the higher pressure outlet side of the fan. Air after passing through the interior of the fan 31 and the apertures between blades 35 exhausts through opening or openings 14.

I have found that, in the foregoing organization of parts, dust including fine powder and like solid particles is accumulated in an annular deposit upon the inner surface of fan section 37, and that the air exhausted at openings 14 is essentially free of those particles. This deposit indicated at 40 in FIGURE 1 does not extend into the bladed section of the fan 31, and so I have been able to provide for its ready removal by insertion of the open ended receptacle 41 lining annular fan section 37. When sufficient material has been collected the nozzles are unscrewed and the paper receptacle 41 pulled out of the fan.

The foregoing action is such as to create a condition of localized turbulence within the outer section 37 of the fan so that the particles are apparently flung with considerable centrifugal force against receptacle 41 where they collect in a compact almost self supporting mass.

Figure 4:
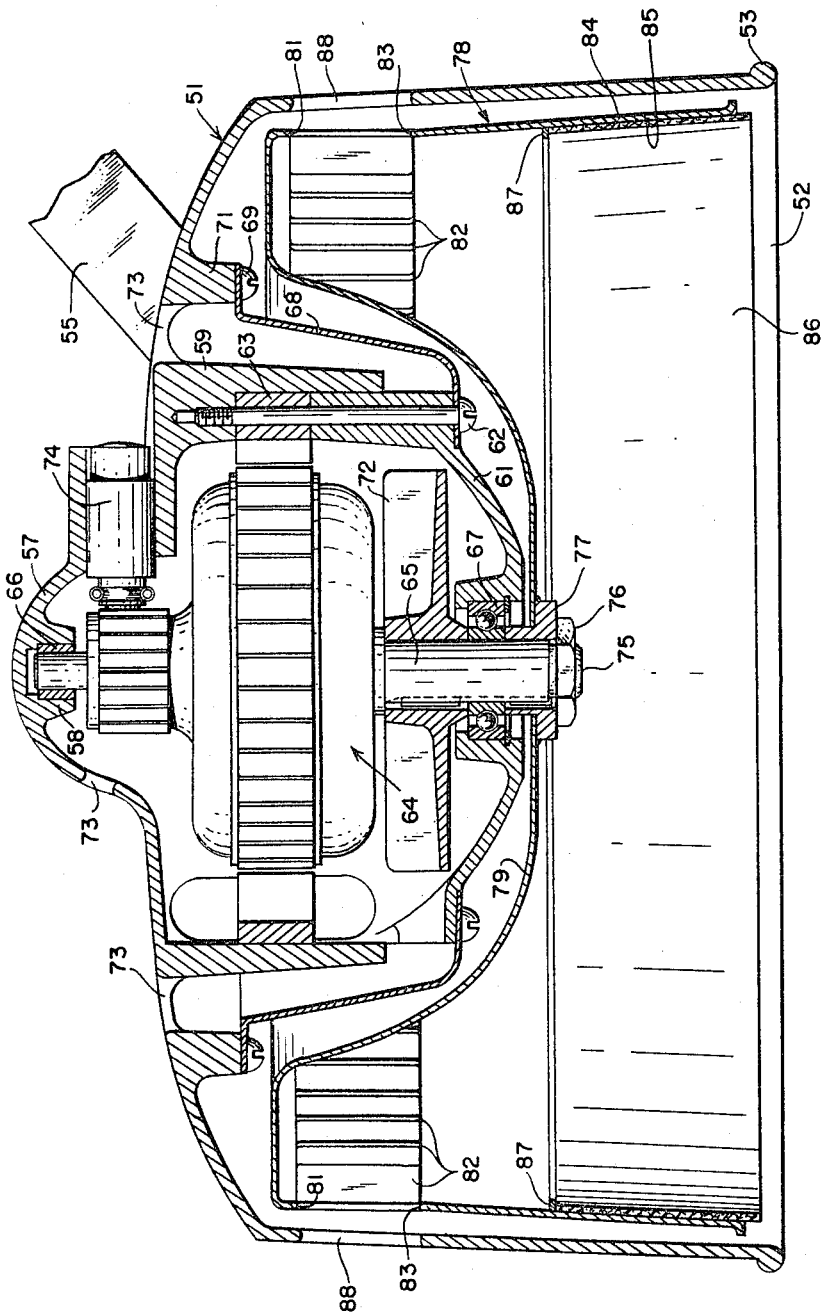
FIGURE 4 is a side elevation mainly in axial section showing another embodiment of the invention.
Figure 5:
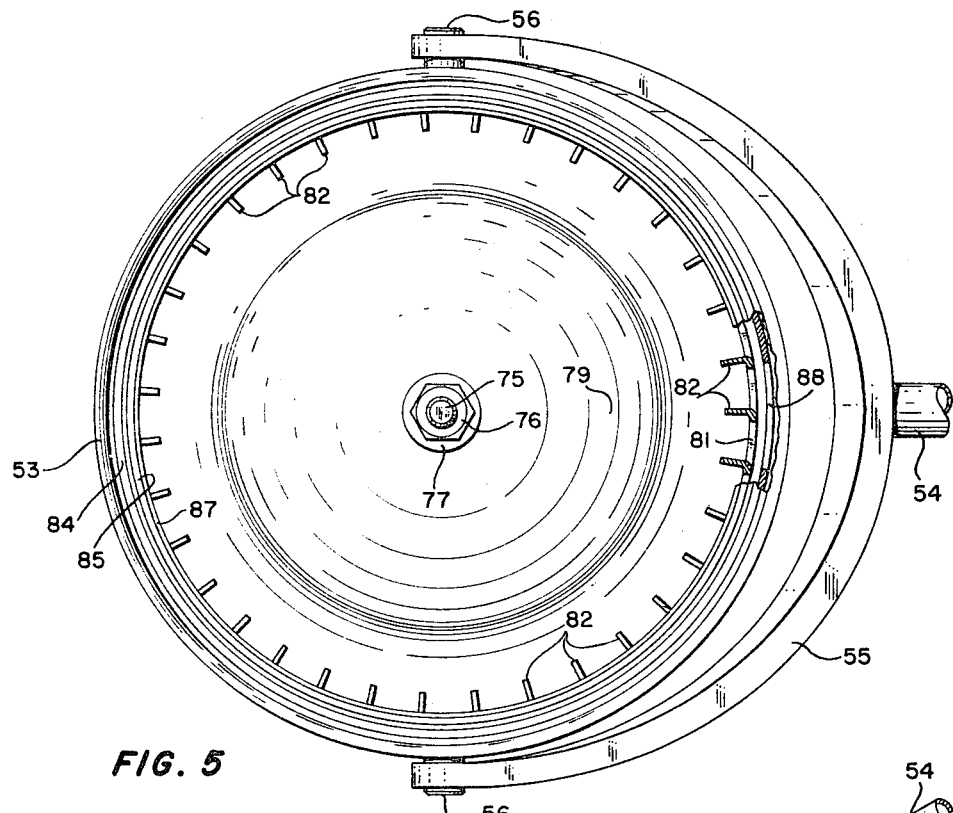
FIGURE 5 is a bottom plan view of the device of FIGURE 4.
Figure 6:
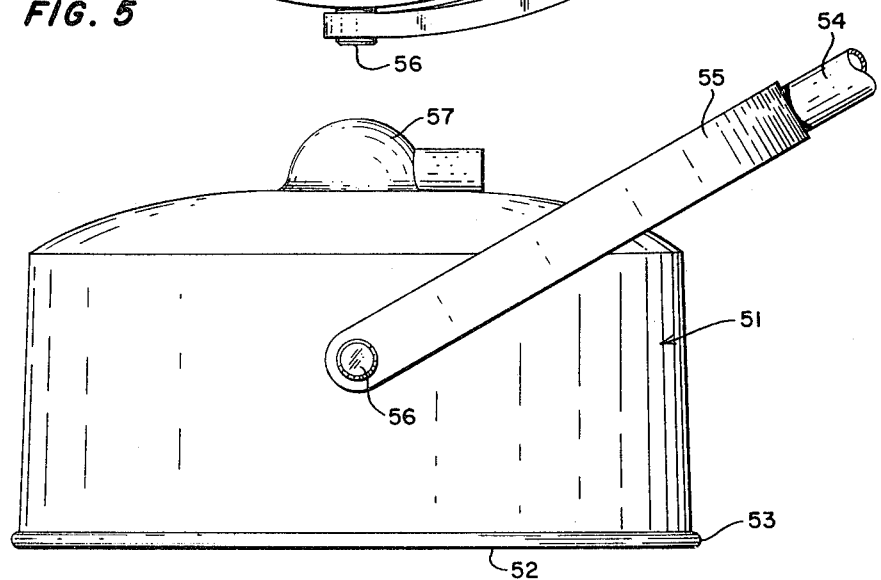
FIGURE 6 is a side elevation of the embodiment of FIGURE 4.

Referring now to the embodiment of FIGURES 4–6 this device is similar to the usual vacuum cleaner in that it comprises a casing 51 having a downwardly facing opening 52 surounded by a smoothly beaded rim 53 adapted to move over the rug or other surface to be cleaned of dust and the like. A handle 54 has its bifurcated lower end 55 pivotally attached to casing 51 on a generally horizontal axis at 56. Casing 51 may be of molded plastic or cast metal.

Internally casing 51 is centrally formed with a dome 57 containing an inner boss 58. A plurality of circumferentially spaced ribs 59 project downwardly from the top wall of casing 51, and an anular bearing support 61 is secured to ribs 59 as by machine screws 62 which also pass through the stator 63 of an electric motor 64. Vertically disposed armature shaft 65 of motor 64 has its upper and lower ends mounted in a radial bearing 66 at boss 58 and a combined radial and thrust bearing at 67 on the support 61.

An imperforate annular sheet metal shroud 68 is secured to support 61 by screws 62 and to an internal casing rib 71 by screws 69 and forms with the casing and support 61 an enclosure for the motor 64. Within this enclosure a radially bladed fan 72 is non-rotatably mounted on armature shaft 65 to circulate motor cooling air entering and leaving upper casing apertures 73. The electrical brush connection 74 to the commutator of the motor enters the top of the casing.

Below the motor enclosure, shaft 65 extends through support 61 and has a reduced diameter threaded terminal 75 on which is mounted a nut 76 engaging a collar 77 non-rotatably slidably keyed on the shaft. The upper end of collar 77 abuts the inner race of bearing 67 to load that bearing when nut 76 is tightened.

A sirocco type fan 78 has an imperforate end wall 79 rigidly secured, as by welding, upon collar 77 below the support 61 so that collar 77 also serves as the fan hub. Fan 78 has a cylindrical section 81 formed with a circumferential series of punched out and bent in short inclined blades 82, separated by apertures 83, as in fan 31, and an outer imperforate throat section 84 that has an inner outwardly diverging surface 85 of small angularity.

An open ended conical receptacle 86 of paper or like disposable material is slidably thrust into fan section 84 into abutment with an inner rigid stop ring 87 and frictionally held there.

A series of air outlet openings 88 are formed in casing 51 opposite to and at the level of fan blades 82. Each opening 88 has about the same axial extent as a blade 82, and preferably the total area of openings 88 may be at least as great or greater than the area of opening 52.

Casing 51 may be circular in cross section as shown, or it may be flat-sided for more close embracement by the bifurcated end of the handle 54.

The operation of this embodiment is fundamentally the same as FIGURES 1–3. The casing 51 is for example placed on a floor carpet to be cleaned, and the motor started. The nature of the carpet and the incoming air cushion are sufficient to enable air to be drawn into opening 52 and the considerable suction applied by the fan results in the dust laden air entering the fan as a swirling stream. The dust particles centrifugally separate to form an annular compact deposit on receptacle 86 as in the earlier embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for separating solid particles from a gas comprising a casing having a longitudinally continuous annular side wall terminating in and defining an open inlet through which gas to be cleaned is introduced, a motor unit mounted within said casing at the end opposite said inlet, a shaft driven by said motor unit, a combined fan and particle collection member having an end wall and an axially extending cylindrical side wall, means mounting said end wall of said combined fan and particle collection member on said shaft so that said member is wholly supported within said casing by said shaft, said cylindrical wall extending substantially coaxially with and in close association with the annular wall of said casing and having an open end adjacent said inlet but within said casing, an annular imperforate particle deposit and collection throat positioned internally at said open end of the cylindrical wall, fan means on said member comprising a circumferential row of longitudinal extending fan blades projecting inwardly from said cylindrical wall and positioned axially downstream of said throat thereby defining gas discharge openings between said blades, and a cleaned gas outlet opening formed in said casing annular wall adjacent said gas discharge openings.

2. In the apparatus defined in claim 1, said combined fan and particle collection member being an integral member having a hub centrally of said end wall for attachment directly upon said shaft.

3. In the apparatus defined in claim 1, means within said throat for positioning a removable and disposable particle collection receptacle lining said throat.

4. In the apparatus defined in claim 3, said positioning means comprising axially fixed radially inwardly extending stop ring mounted within said member substantially at the juncture between said throat and said fan means.

5. In the apparatus defined in claim 3, a nozzle housing removably mounted on said casing over said inlet and having an opening extending transversely with respect to said inlet and transversely with respect to the longitudinal axis of said casing, said receptacle being removable by first detaching said nozzle housing from said casing.

6. In the apparatus defined in claim 1, said casing and member side walls defining an annular space between them which is in direct communication at its inner end with higher pressure gas emerging from said fan discharge openings.

References Cited

UNITED STATES PATENTS

| | | | |
|---|---|---|---|
| 1,420,665 | 6/1922 | Newcombe | 55—408 |
| 1,513,763 | 11/1924 | Rowe | 230—134.5 |
| 2,031,734 | 2/1936 | Riebel et al. | 55—408 X |
| 2,233,520 | 3/1941 | De Vigan | 55—401 |
| 2,793,710 | 5/1957 | Robinson | 55—406 X |
| 3,092,583 | 6/1963 | Wolff et al. | 55—408 X |

HARRY B. THORNTON, *Primary Examiner.*

S. W. SOKOLOFF, *Assistant Examiner.*